United States Patent
Shackelford et al.

(10) Patent No.: US 11,297,802 B2
(45) Date of Patent: Apr. 12, 2022

(54) SYSTEMS AND METHODS OF DIGITAL TRACKING OF WELLNESS PROGRAMS WITH DYNAMIC FEEDBACK FROM PETS AT DIFFERENT CLINICS USING DIFFERENT MANUFACTURER PRODUCTS

(71) Applicant: Greenline, LLC, Franklin, TN (US)

(72) Inventors: Phillip G. Shackelford, Memphis, TN (US); Nick Meurrier, Franklin, TN (US)

(73) Assignee: GREENLINE, LLC, Memphis, TN (US)

( * ) Notice: Subject to any disclaimer, the term of this patent is extended or adjusted under 35 U.S.C. 154(b) by 0 days.

(21) Appl. No.: 16/883,973

(22) Filed: May 26, 2020

(65) Prior Publication Data
US 2021/0368742 A1 Dec. 2, 2021

(51) Int. Cl.
*G08B 23/00* (2006.01)
*A01K 29/00* (2006.01)
*G06Q 40/00* (2012.01)

(52) U.S. Cl.
CPC .......... *A01K 29/005* (2013.01); *G06Q 40/10* (2013.01)

(58) Field of Classification Search
CPC ...... G06Q 10/00; G06Q 40/10; A01K 29/005; A01K 1/0107; A01K 5/0114; A01K 7/00; A01K 31/12; A01K 5/02; A01K 11/006; G01G 17/08; G01G 21/22; G01G 19/22; G08B 21/182; G16Z 99/00; Y02A 90/10; G16H 20/60; G16H 50/30

USPC ............ 340/573.3, 573.1; 119/421, 417, 452
See application file for complete search history.

(56) References Cited

U.S. PATENT DOCUMENTS

| | | | |
|---|---|---|---|
| 2003/0136834 A1* | 7/2003 | Scheurer | G06Q 10/087 235/385 |
| 2010/0301113 A1 | 12/2010 | Bohn et al. | |
| 2011/0010229 A1 | 1/2011 | Ow | |
| 2012/0072321 A1* | 3/2012 | Christian | G06Q 40/123 705/31 |
| 2012/0231438 A1* | 9/2012 | Fakhrai | G09B 7/00 434/350 |
| 2013/0024267 A1 | 1/2013 | Libenson et al. | |
| 2015/0032611 A1* | 1/2015 | Crowley | G06Q 20/102 705/40 |
| 2016/0071197 A1* | 3/2016 | Elsworth | G06Q 30/0224 705/14.25 |
| 2016/0210578 A1* | 7/2016 | Raleigh | H04M 15/80 |

(Continued)

*Primary Examiner* — Anh V La
(74) *Attorney, Agent, or Firm* — One LLP

(57) ABSTRACT

The systems and methods of flexible and customizable wellness program plan for pets through a distribution network connecting pet-owners, manufacturers, clinics and veterinarians, comprising: customizing a wellness plan to include one or more of the following parameters: frequency of services including exams or bloodwork, frequency of products used including vaccinations or preventatives and frequency of payments; customizing payment frequency for veterinarians for services rendered; tracking commissions to manufacturers for products used; tracking profitability for clinics implementing the wellness program; tracking wellness program plan usage by a pet; tracking enrollment and expiry status of a wellness program plan for a pet; dynamically reporting to one or more of the following: manufacturer, clinic, veterinarian or pet-owner.

20 Claims, 18 Drawing Sheets

(56) References Cited

U.S. PATENT DOCUMENTS

| | | |
|---|---|---|
| 2017/0092900 A1 | 3/2017 | Yang |
| 2017/0293888 A1* | 10/2017 | Shackelford ........... G16H 40/67 |
| 2017/0354180 A1 | 12/2017 | Fornarelli |
| 2021/0374657 A1 | 12/2021 | Shackelford et al. |
| 2021/0374789 A1 | 12/2021 | Shackelford et al. |

* cited by examiner

Go to Rx Mapping

Wellness

Pricing Schedule: (manage)  Clinic Tax: (manage)

Term 1 (2/15/19 - 6/1/20) [CURRENT] ▼    2/15/19 - ▼   Products Tax Rate: [ ] %   Services Tax Rate: [ ] %

800

820

Wellness Mappings (34 records)

| All Categories ▼ | | | | | |
|---|---|---|---|---|---|
| Clinic Product | | Commissionable Amount | Compliance Duration | Tax Exempt? | Export |
| 810 | | | | | |
| ⊕ ⊙ ✦ Bloodwork | | | | | |
| ⊕ ⊙ ✦ Bordetella | | | | | |
| ⊕ ⊙ ✦ Canine Core Vaccine | | | | | |
| ⊕ ⊙ ✦ Deworming | | | | | |
| ⊕ ⊙ ✦ Exam | | | | | |
| ⊕ ⊙ ✦ Fecal/Parasite screen | | | | | |

FIG. 8

| All Categories ▼ | | | | |
|---|---|---|---|---|
| | Clinic Product | Commissionable Amount | Compliance Duration | Tax Exempt? |
| ⊞ ⊙ ♀ Bloodwork | | | | |
| ⊞ ⊙ ♀ Bordetella | (6016) WP Bordetella Vaccine | | 14.20 | ☑ Save Clear ⊞ |
| ⊞ ⊙ ♀ Canine Core Vaccine | (6016) WP DAPP Annual Vaccine | | 15.94 | ☑ Save Clear ⊞ |
| ⊞ ⊙ ♀ Deworming | | | | |
| ⊞ ⊙ ♀ Exam | | | | |
| ⊞ ⊙ ♀ Fecal/Parasite screen | | | | |
| ⊞ ⊙ ♀ Feline Core Vaccine | | | | |
| ⊞ ⊙ ♀ Felv | | | | |
| ⊞ ⊙ ♀ Felv/FIV Test | | | | |
| ⊞ ⊙ ♀ Flu | | | | |
| ⊞ ⊙ ♀ Heartworm Test | | | | |

*FIG. 9*

Ashley Douglass, DVM

| ☐ | Client ▲ | Patient Name | Inv. # | Inv. Date | Product | Qty | Type | Commission Amount | Processed | |
|---|---|---|---|---|---|---|---|---|---|---|
| ☐ | Cruz | Richie Vip | 118392 | 01/06/2020 | Rabies Vaccine-1 year Richie Vip | 1 use | Rabies 1 Yr | $3.00 | 1/7/20 6:29 AM | VOID |
| ☐ | Fricke | Jake Vip | 118603 | 01/06/2020 | Wellness Plan Canine 0-23# Jake Vip | 1 | Plan Enrollment | ($7.80) | 1/9/20 9:13 AM | VOID |
| ☐ | Fricke | Jake Vip | 118603 | 01/06/2020 | Wp Puppy/Kitten Exam Jake Vip | 1 use | Exam | $6.63 | 1/9/20 9:13 AM | VOID |
| ☐ | Fricke | Jake Vip | 118603 | 01/06/2020 | Fecal Exam Jake Vip | 1 use | Fecal/Parasite screen | $4.61 | 1/9/20 9:13 AM | VOID |
| ☐ | Fricke | Jake Vip | 118603 | 01/06/2020 | Interceptor 2-8# Jake Vip | 1 month | Heartworm | $1.24 | 1/9/20 9:13 AM | VOID |
| ☐ | Fricke | Jake Vip | 118603 | 01/06/2020 | Credelio 6.1-12# Jake Vip | 1 month | Flea/Tick | $2.95 | 1/9/20 9:13 AM | VOID |
| ☐ | Garland | Sissy | 118543 | 01/04/2020 | DAPP- 1st Vaccine Sissy | 1 use | Puppy Vaccine | $3.19 | 1/9/20 9:13 AM | VOID |
| ☐ | Garland | Sissy | 118543 | 01/04/2020 | Lepto 1st Vaccine Sissy | 1 use | Puppy Vaccine | $3.38 | 1/9/20 9:13 AM | VOID |
| ☐ | Garland | Sissy | 118543 | 01/04/2020 | Credelio 25.1-50# Sissy | 3 months | Flea/Tick | $8.85 | 1/9/20 9:13 AM | VOID |
| ☐ | Garland | Sissy | 118543 | 01/04/2020 | Interceptor 25.1-50# Sissy | 3 months | Heartworm | $4.42 | 1/9/20 9:13 AM | VOID |
| ☐ | Garland | Sissy | 118543 | 01/04/2020 | Wellness Plan Canine 25-50# Sissy | 1 | Plan Enrollment | ($8.00) | 1/9/20 9:13 AM | VOID |
| ☐ | Garland | Sissy | 118543 | 01/04/2020 | Bordetella Vaccine Sissy | 1 use | Bordetella | $2.84 | 1/9/20 9:13 AM | VOID |
| ☐ | Garland | Sissy | 118543 | 01/04/2020 | Fecal Exam Sissy | 1 use | Fecal/Parasite screen | $4.61 | 1/9/20 9:13 AM | VOID |
| ☐ | Garland | Sissy | 118543 | 01/04/2020 | Heartworm Test Sissy | 1 use | Heartworm Test | $5.63 | 1/9/20 9:13 AM | VOID |
| ☐ | Garland | Sissy | 118543 | 01/04/2020 | Rabies Vaccine-1 year Sissy | 1 use | Rabies 1 Yr | $3.00 | 1/9/20 9:13 AM | VOID |
| ☐ | Garland | Sissy | 118543 | 01/04/2020 | Wellness Office Visit Sissy | 1 use | Exam | $8.02 | 1/9/20 9:13 AM | VOID |
| ☐ | Jones | Mae Vip | 118555 | 01/08/2020 | Bordetella Vaccine Mae Vip | 1 use | Bordetella | $2.84 | 1/9/20 9:13 AM | VOID |
| ☐ | Jones | Ella Vip | 118555 | 01/08/2020 | Bordetella Vaccine Ella Vip | 1 use | Bordetella | $2.84 | 1/9/20 9:13 AM | VOID |

FIG. 12

| | | | | | | | |
|---|---|---|---|---|---|---|---|
| ☑ | Trujillo | Milo Vip | 116692 | 10/29/2019 | DAPP - 2nd Vaccine Milo Vip | 1 use | ○ Puppy Vaccine | $2.87 | 1/9/20 9:13 AM VOID |
| ☑ | Trujillo | Milo Vip | 116692 | 10/29/2019 | Lepto Vaccine Annual Milo Vip | -1 use | ○ Lepto | ($3.04) | 1/9/20 9:13 AM Adjustment |
| ☑ | Trujillo | Milo Vip | 116692 | 10/29/2019 | Lepto Vaccine Annual Milo Vip | 1 use | ○ Lepto | $3.04 | 1/9/20 9:13 AM VOID |
| ☑ | Trujillo | Milo Vip | 116692 | 10/29/2019 | Rabies Vaccine- 1 year Milo Vip | -1 use | ○ Rabies 1 Yr | ($2.70) | Adjustment |
| ☑ | Trujillo | Milo Vip | 116692 | 10/29/2019 | Rabies Vaccine- 1 year Milo Vip | 1 use | ○ Rabies 1 Yr | $2.70 | 1/9/20 9:13 AM VOID |
| ☑ | Trujillo | Milo Vip | 116692 | 10/29/2019 | Credelio 25.1-50# Milo Vip | -1 month | ○ Flea/Tick | ($2.65) | Adjustment |
| ☑ | Trujillo | Milo Vip | 116692 | 10/29/2019 | Credelio 25.1-50# Milo Vip | 1 month | ○ Flea/Tick | $2.65 | 1/9/20 9:13 AM VOID |
| ☑ | Trujillo | Milo Vip | 116692 | 10/29/2019 | Interceptor 25.1-50# Milo Vip | -1 month | ○ Heartworm | ($1.33) | Adjustment |
| ☑ | Trujillo | Milo Vip | 116692 | 10/29/2019 | Interceptor 25.1-50# Milo Vip | 1 month | ○ Heartworm | $1.33 | 1/9/20 9:13 AM VOID |
| | | Total for Dr. Brent Dennis, DVM | | | | | (Selected: $50.49) $0.49 | |
| Totals for Clinic: | | | | | | | (Selected: $50.49) $246.67 | |

Pet Plan Tracking

Review the progress of pet wellness plans in your clinic

Show [10 ▼] entries    ADD NEW

Showing 1 to 10 of 442 entries    Search: [        ]

First | Previous | [1] [2] [3] [4] [5] ... [45] | Next | Last

| Client | Patient Name | Plan | Plan Start Date | Plan Duration | Last Payment Received | Plan Status | |
|---|---|---|---|---|---|---|---|
| Alan Saldana Becerra (41431) | Lucy - Vip (7) | Cat | 8/15/2019 | 12 Months | 1/1/2020 | Active | EDIT |
| Aleida (19133) | Chiquilla Vip (49081) | Small Dog | 10/21/2019 | 12 Months | 1/7/2020 | Active | EDIT |
| Aleida (19133) | Chanel Vip (49083) | Medium Dog | 10/21/2019 | 12 Months | 1/7/2020 | Active | EDIT |
| Alexander Martin (42136) | Link (1) | Cat | 12/23/2019 | 12 Months | 12/23/2020 | Active | EDIT |
| Alexis Salgado (39620) | Bucky - Vip (1) | Large Dog | 6/19/2019 | 12 Months | 1/10/2020 | Active | EDIT |
| Ali Guthrie (41878) | Beelzebub (bub) Vip (1) | Medium Dog | 6/19/2019 | 12 Months | 12/15/2020 | Active | EDIT |
| Ali Guthrie (41878) | Cookie - Vip (2) | Small Dog | 6/19/2019 | 12 Months | 12/15/2020 | Active | EDIT |
| Allida Murphy (40854) | Pusheen (4) | Cat | 11/29/2019 | 12 Months | 1/5/2020 | Active | EDIT |
| Allison Vlassis (40787) | Sadie - Vip (1) | Small Dog | 7/11/2019 | 12 Months | 12/15/2020 | Active | EDIT |
| Amber Ellis (39707) | Rocky - Vip (1) | Small Dog | 8/17/2019 | 12 Months | 12/15/2020 | Active | EDIT |

First | Previous | [1] [2] [3] [4] [5] ... [45] | Next | Last

Showing 1 to 10 of 442 entries

*FIG. 15*

Pet Plan Tracking

Review the progress of pet wellness plans in your clinic

Show [10 ▾] entries

Search: [        ]

Showing 1 to 10 of 442 entries

[First] [Previous] [1] [2] [3] [4] [5] ... [45] [Next] [Last]    [ADD NE...]

| | Client | Patient Name | Last Invoice Date | Plan | Plan Start Date | Plan Duration | Last Payment Received | Plan Status | |
|---|---|---|---|---|---|---|---|---|---|
| ⊞ | Alan Saldana Becerra (41431) | Lucy- Vip (7) | 11/11/2019 | Cat | 8/15/2019 | 12 Months | 1/1/2020 | Active | EDIT |
| ⊞ | Aleida (1913) | Chiquilla Vip (49081) | 10/21/2019 | Small Dog | 10/21/2019 | 12 Months | 1/7/2020 | Active | EDIT |
| ⊟ | Aleida (1913) | Chanel Vip (49083) | 10/21/2019 | Medium Dog | 10/21/2019 | 12 Months | 1/7/2020 | Active | EDIT |

| Service | Doses/Users Remaining | Last Invoice | Last Item Purchased | | Next Dispense Date |
|---|---|---|---|---|---|
| ⊕ Bordetella | 1 | 11/11/2019 | 117078 | Bordetella Vaccine Chanel Vip (6016) | N/A |
| ⊕ Canine Core Vaccine | 0 | 10/21/2019 | 116399 | DAPP Annual Vaccine Chanel (6015) | N/A |
| ⊕ Exam | 0 | 11/11/2019 | 117078 | WP Puppy/Kitten Exam Chanel Vip (6050) | N/A |
| ⊕ Fecal/Parasite screen | 0 | 10/21/2019 | 116399 | Fecal Exam Chanel (6001) | N/A |
| ⊕ Heartworm Test | 1 | n/a | n/a | n/a | N/A |
| ⊕ Lepto | 0 | 1/7/2020 | 118640 | Lepto Vaccine Annual Chanel Vip (6018) | N/A |
| ⊕ Nail Trim | 6 | n/a | n/a | n/a | N/A |
| ⊕ Puppy Vaccine | unlimited | 11/11/2019 | 117078 | DAPP_ 2nd Vaccine Chanel Vip (6012) | N/A |
| ⊕ Rabies 1 Yr | 0 | 1/7/2020 | 118640 | Rabies Vaccine- 1 year Chanel Vip (6010) | N/A |
| ⊕ Flea/Tick | 7 | 1/7/2020 | 118640 | Credelio 25.1-50# Chanel Vip (6063) | 4/7/2020 |
| ⊕ Heartworm | 7 | 1/7/2020 | 118640 | Interceptor 25.1-50# Chanel Vip (6036) | 4/7/2020 |
| Paid In Clinic | unlimited | n/a | n/a | n/a | N/A |

| Client | Patient Name | Plan | Plan Start Date | Plan Duration | Last Payment Received | Plan Status | |
|---|---|---|---|---|---|---|---|
| Antonia Olivera-Santos (42019) | Perla Vip (1) | Small Dog | 10/26/2019 | 12 Months | 1/6/2020 | Cancelled | EDIT |
| Audrey Lopez (41354) | Coco - Vip (1) | Small Dog | 2/25/2019 | 12 Months | 2/25/2019 | Cancelled | EDIT |
| Audrey Lopez (41354) | Bear - Vip (2) | Small Dog | 5/25/2019 | 12 Months | 12/15/2019 | Cancelled | EDIT |
| Benjamin Sanchez (38572) | Max-vip (2) | Large Dog | 4/5/2019 | 12 Months | 4/5/2019 | Cancelled | EDIT |
| Blair Tucker (39635) | Bella - Vip (1) | Small Dog | 9/11/2019 | 12 Months | 12/31/2019 | Cancelled | EDIT |
| Brenda O'keefe (41592) | Ira - Vip (1) | Small Dog | 5/24/2019 | 12 Months | 12/21/2019 | Cancelled | EDIT |
| Brittanny Cosme (39807) | Mr. Ace-vip (13) | Large Dog | 4/22/2019 | 12 Months | 4/22/2019 | Cancelled | EDIT |
| Cassandra Stephens (37102) | Hammer - Vip (3) | Large Dog | 9/20/2019 | 12 Months | 1/8/2020 | Cancelled | EDIT |
| Claudia Ocampo (41417) | Colondina - Vip (1) | Large Dog | 3/22/2019 | 12 Months | 3/22/2019 | Cancelled | EDIT |
| Claudia Ocampo (41417) | Paloma (2) | Large Dog | 3/27/2019 | 12 Months | 3/27/2019 | Cancelled | EDIT |

FIG. 17

SYSTEMS AND METHODS OF DIGITAL TRACKING OF WELLNESS PROGRAMS WITH DYNAMIC FEEDBACK FROM PETS AT DIFFERENT CLINICS USING DIFFERENT MANUFACTURER PRODUCTS

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The following Greenline, LLC's concurrently filed patent applications are incorporated herein by reference: (1) Ser. No. 16/883,952, titled "SYSTEMS AND METHODS OF IMPLEMENTING AT RESELLER FLEXIBLE AND CUSTOMIZABLE ARCHITECTURE OF TRANSACTION LEVEL SECURITY, AUTHENTICATION AND DIGITAL VERIFICATION OF COUPONS THAT IS CUSTOMER-CENTRIC"; (2) Ser. No. 16/883,860, titled "SYSTEMS AND METHODS OF VALIDATING DATA ENTRY AND GENERATING ERROR FLAGS USING ARTIFICIAL INTELLIGENCE."

FIELD OF THE INVENTION

The present invention is in the technical field of flexible and customizable wellness program plan for pets through a distribution network connecting pet-owners, manufacturers, clinics and veterinarians. More particularly, the present invention is in the technical field of allowing industry-wide customization that favors the consumer without requiring to be tied to a particular clinic, manufacturer or veterinarian. More particularly, the present invention is in the technical field of allowing flexibility and control through a distributed processing platform.

BACKGROUND

Current wellness plans for pets are tied to a manufacturer or a clinic location. A pet-owner does not see the flexibility in choosing different wellness plan options at affordable clinics. Startup costs to invest in a wellness plan, implementation and operations are formidable at a clinic level. Wellness plans require a mix of products and service options with providers of their choice. Simple accounting, contracts, invoicing and IT solutions do not address or give flexibility, customization and options to pet-owners at various clinics who do not have resources and bandwidth to implement a wellness plan.

SUMMARY OF THE INVENTION

The present invention is systems and methods of flexible and customizable wellness program plan for pets through a distribution network connecting pet-owners, manufacturers, clinics and veterinarians, comprising: customizing a wellness plan to include one or more of the following parameters: frequency of services including exams or bloodwork, frequency of products used including vaccinations or preventatives and frequency of payments; customizing payment frequency for veterinarians for services rendered; tracking commissions to manufacturers for products used; tracking profitability for clinics implementing the wellness program; tracking wellness program plan usage by a pet; tracking enrollment and expiry status of a wellness program plan for a pet; dynamically reporting to one or more of the following: manufacturer, clinic, veterinarian or pet-owner.

The systems and methods of flexible and customizable wellness program plan for pets through a distribution network connecting pet-owners, manufacturers, clinics and veterinarians, further comprising receiving input from a clinic to create a wellness program plan.

The systems and methods of flexible and customizable wellness program plan for pets through a distribution network connecting pet-owners, manufacturers, clinics and veterinarians, further comprising: providing pricing based on wellness program plan enrollment status for a period of time.

The systems and methods of flexible and customizable wellness program plan for pets through a distribution network connecting pet-owners, manufacturers, clinics and veterinarians, further comprising: customizing tax rate based on clinic location.

The systems and methods of flexible and customizable wellness program plan for pets through a distribution network connecting pet-owners, manufacturers, clinics and veterinarians, wherein the reporting includes audit reports.

The systems and methods of flexible and customizable wellness program plan for pets through a distribution network connecting pet-owners, manufacturers, clinics and veterinarians, wherein the reporting includes an inventory report for a clinic based on products used in the wellness program.

The systems and methods of flexible and customizable wellness program plan for pets through a distribution network connecting pet-owners, manufacturers, clinics and veterinarians, wherein the reporting includes reporting of all services provided for the wellness program plan by a veterinarian at a clinic.

The systems and methods of flexible and customizable wellness program plan for pets through a distribution network connecting pet-owners, manufacturers, clinics and veterinarians, further comprising: allowing adjustments and corrections through a verified sign-off process.

The systems and methods of flexible and customizable wellness program plan for pets through a distribution network connecting pet-owners, manufacturers, clinics and veterinarians, further comprising: allowing corrections without requiring re-entry of invoices.

The systems and methods of flexible and customizable wellness program plan for pets through a distribution network connecting pet-owners, manufacturers, clinics and veterinarians, further comprising: providing reminders to pet-owners on upcoming service or product usage.

BRIEF DESCRIPTION OF THE DRAWINGS

The embodiments of this invention are illustrated by way of example and not limitation in the figures of the accompanying drawings, in which like references indicate similar elements and in which:

FIG. 8 is an exploded view of creating a wellness plan for a clinic, according to one embodiment.

FIG. 9 is an exploded second view of creating a wellness plan for a clinic, according to one embodiment.

FIG. 12 is an exploded view of a service provider handling users and related transactions, according to one embodiment.

FIG. 13 is a second exploded view of a service provider handling users and related transactions, according to one embodiment.

FIG. 14 is an exploded view of wellness plan accounting, according to one embodiment.

FIG. 15 is an exploded view of tracking from a user's perspective, according to one embodiment.

FIG. 16 is a second exploded view of tracking from a user's perspective, according to one embodiment.

FIG. 17 is a third exploded view of tracking from a user's perspective, according to one embodiment.

DETAILED DESCRIPTION OF THE INVENTION

Figure 1:
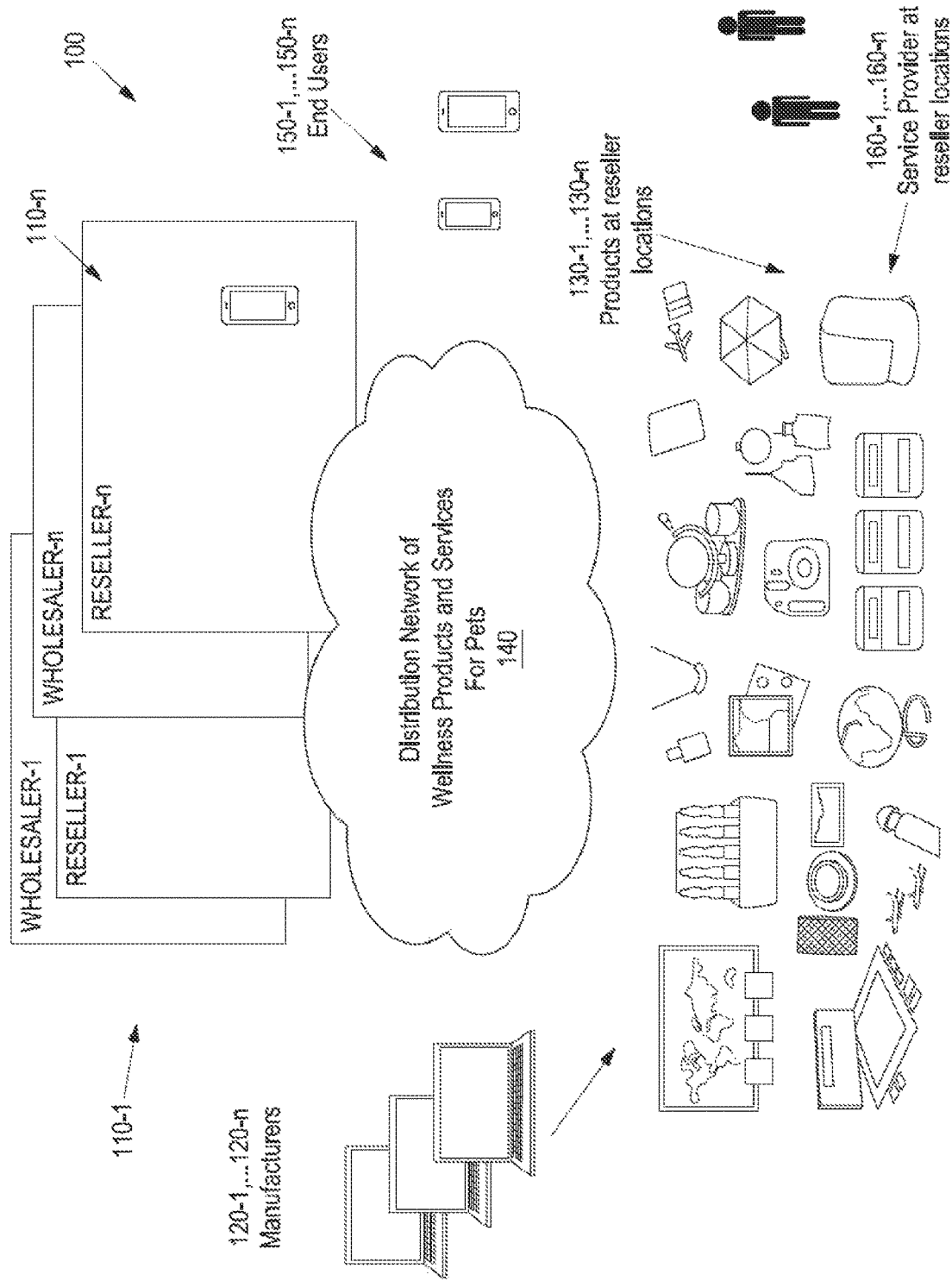
FIG. 1 shows a diagram illustrating an example of systems and methods of flexible and customizable wellness program plan for pets through a distribution network connecting pet-owners, manufacturers, clinics and veterinarians with different types and categories of computing devices and varied products at veterinary clinics from different manufacturers and service providers.

The systems and methods of flexible and customizable wellness program plan for pets through a distribution network connecting pet-owners, manufacturers, clinics and veterinarians includes techniques to enable different clinics to provide seamless wellness plans for pets giving flexibility in customization of the plans, products used as well as service providers involved. Most of the clinics do not have resources and bandwidth to invest in wellness plans. When a wellness plan is implemented, a clinic can efficiently implement such a plan track in terms of accounting, renewal at the end of the year and associated discounted billing. A clinic can also track as to whether the wellness plan made profit for the clinic after paying manufacturers for the products and any veterinarians or service providers for the services under the plan. A veterinarian may be commission based or salaried and the wellness plan allows for computation of costs and usage under either model. A manufacturer may provide different coupon deals that can be incorporated into the wellness plan with customization and flexibility.

The systems and methods of flexible and customizable wellness program plan allows a single clinic to promote more than one wellness plan at the same time. It allows a subscription service that allows users to have pet related information readily available on their computing devices including mobile applications or web-browser related interfaces on their laptops. The system allows for tracking of all rebates applied and how many of those applied were reimbursed. Such a system allows reconciliation of different rebates used for a cap at the total annual amount.

The systems and methods of flexible and customizable wellness program plan allows monitoring of clinic input data. It can check for fake free doses, changing addresses, rebates going to the same addresses and flag any standard deviations from activities. The wellness plan is implemented to catch rogue employees who are stealing on invoices. This prevents manufacturers from giving away more money in rebates than the amount they received in payments for selling the products.

This invention discloses a novel mechanism that is used to aid in scaling even small business who do not have the bandwidth to invest in computer IT and customized solutions. Irrespective of the level of sophistication of the users or computer systems, the invention provides a mechanism to promote efficiencies in transaction handlings. Such a solution is not dependent on the brand names, product types or manufacturers. Regardless of who operates the wellness plan system, its operations are flexible and streamlined without any accounting or maintenance headaches.

A Wellness Engine (WE) is a new module that is designed to build, track, pay commissions on, and report out on wellness plans. Wellness plans can be broadly defined as pay over-time or subscription plans that most commonly cover a pet's annual exam, vaccinations, bloodwork, and yearly preventatives. The appeal of these plans for consumers is the ability to pay for top notch care for their pets over time and keep up with the rising cost of veterinary services. While somewhat simple to build, wellness plans become exponentially harder to manage as more users sign up in the practice.

Another important aspect of a wellness plan is that the client is not charged when he or she comes in and a clinic performs a covered service. But doctors are still expecting commission and the hospital still needs a way to report revenue versus the plan.

This is administrative part of what makes wellness plans complex. It is not trivial to figure revenue or commission on zero-dollar items in an easy or efficient way, while at the same time keeping track of what services or other items on the plan (such as vaccines) are still available to the client at no cost. When combined with the administrative activities, such as managing commission rates and payments, the administration of wellness plans requires dedicated personnel.

The main benefit of the Wellness program Engine (WE) to the clinic is the aggregation of commission reporting and management, doctor payment, plan usage history, and plan item availability for all clients in the clinic is a series of easy-to-use reports and web pages. Because the source of the WE is the invoice data sent daily, no duplicate or manual data entry is required during day-to-day administration of the clients and patients enrolled in plans on web site. The WE can report to clinics as well as product manufacturers.

In one embodiment, FIG. 1 depicts a diagram 100 illustrating an example of systems and methods of flexible and customizable wellness program plan for pets through a distribution network 140 connecting pet-owners 150-1 to 150-n, manufacturers 120-1 to 120-n, clinics 110-1 to 110-n and veterinarians 160-1 to 160-n, with different types and categories of computing devices and varied products 130-1 to 130-n at veterinary clinics from different manufacturers. In the example of FIG. 1, the environment includes a set of clinics that have varied computer systems and IT departments at 110-1 through an nth clinic system 110-n, a distribution network 140, a set of manufacturers supplying the products 120-1 to 120-n, different products originating from different manufacturers having variable parameters for each clinic at 130-1 to 130-n, and end-users or pet owners at 150-1 to 150-n who may or may not have a computing device, i.e. a web-browser application or a mobile application that connects to the network 140. The end-users may also use services from veterinarians, nurses and other service providers 160-1 to 160-n who may be independent contractors or employees at different clinics 110-1 to 110-n.

In an implementation, the clinic computing system 110 includes components related to network connectivity. In one implementation, the clinic computing system 110 includes hardware and software components to enable data-entry from different computing stations local to the clinic or remote. In one embodiment, the transaction entry is through execution of speech commands. In another implementation, the computing device 110 includes capability to directly communicate with the distribution network 140 that includes authentication and secure communication. The clinic 110 also includes capability to handle variety of pets in one implementation. In one implementation, the clinic 110 specializes in a specific species, for example, cats or dogs. Each clinic is independent of the other and not in any way associated in terms of ownership, control or computer systems installed. In one embodiment, a group of clinics are associated with each other.

The role of the computing device manufacturers 120-1 to 120-n is separated from the use of the computing devices at clinics 110-1 to 110-n. While the manufacturers may have a business partnership with clinics 110-1 to 110-n, typically manufacturers do not control the information technology or computer systems that exist at clinics. A manufacturer freely associates with one or more clinics. The data processing invention allows for manufacturers to audit inventory at clinics without adding cumbersome techniques of manual review. Broadly speaking, a manufacturer may have more sophisticated computer systems and applications than those available at clinics.

For a wellness plan, a user or pet-owner with computing device 150-1 to 150-n may visit a clinic to make subscription to a customized plan that is tailored specifically to the needs of his or her own pet. Such a wellness plan may include one or more purchases related to products 130-1 to 130-n as well as combination of services provided by service providers 160-1 to 160-n.

A person of ordinary skill in the art would appreciate that a clinic is a small business that does not have the resources to integrate different veterinarian service options with products from different manufacturers and track transactions tied to a customized subscription plan for a period longer than a year. Many of these clinics reset prices yearly and any contract involving a longer subscription plan is lost. Clinics with the wellness plan disclosed herein can now provide well-informed wellness plans that can be automatically tracked for rebates and costs. A clinic can also pull up revenue and costs at any time to analyze whether a particular wellness plan is working within the estimated profit margins.

From the perspective of a service provider, for example, a veterinarian, the wellness plan now provides tracking irrespective of whether the veterinarian is paid a salary or a commission from the wellness plan subscriptions. A veterinarian can pull up the record of his patients and assess whether a given clinic is making payments to him or her on a timely basis and whether his participation in the wellness plan is working with the estimated profits for him.

From the perspective of a manufacturer, the wellness plan provides flexibility to provide rebates based on prior purchases that could span longer than a year. The manufacturer can figure out anomalies in the rebates as well as track a clinic's efficiency in terms of selling products as well as attracting regular paying users through the subscription plans.

From the perspective of an end-user, for example, a pet owner, the wellness plan are available at affordable clinics with ease of information on the pet's health and record as well as past or upcoming payments. By bringing these efficiencies, the wellness plan promotes good health in pets as well as makes it affordable to many pet-owners.

Distribution Network 140 can be different wireless and wired networks available to connect different computer devices including client and server systems. In an implementation, distribution network 140 is publicly accessible on the internet through secure messaging protocol described herein. In an implementation, distribution network 140 is inside a secure corporate wide area network. In an implementation, distribution network 140 allows connectivity of different systems and devices using a computer-readable medium.

The messaging and notification between different components can be implemented using Application Programming Interface (API) calls, eXtensible Markup Language ("XML") or Javascript Object Notation ("JSON") config file interfaces between different interfaces, Hypertext Preprocessor (earlier called, Personal Home Page) ("PHP"), Python, Node.js, Java/C++ object-oriented programming or simple web-based tools.

Different components may also implement authentication and encryption to keep the data and the requests secure. Authentication of a device may be accomplished using public/private key, passwords, token, transaction, biometrics, multi-factor authentication or other methods known in the industry. Encryption may use data encryption standard (DES), TripleDES, Rivest-Shamir-Adleman (RSA) algorithm, Advanced Encryption Standard (AES) or other methods known in the industry.

Figure 2:
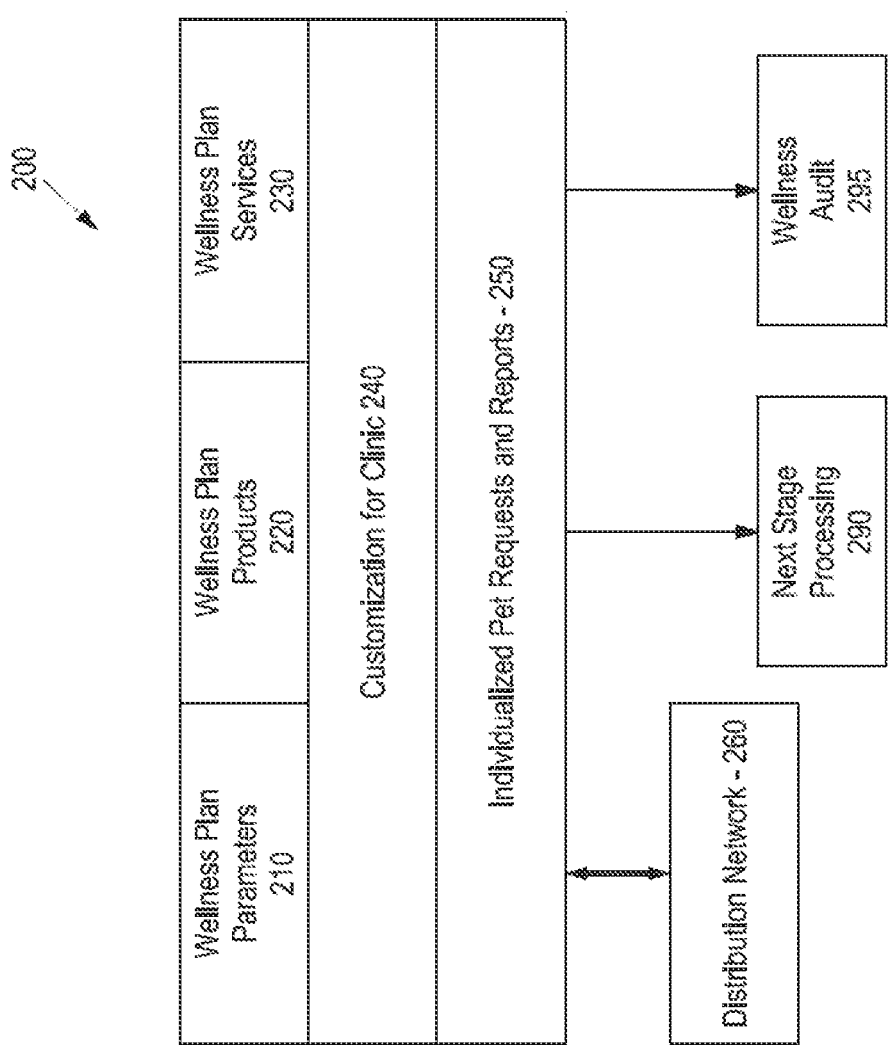
FIG. 2 shows exploded view of a computing device with different interfaces included in systems and methods of flexible and customizable wellness program plan for pets through a distribution network connecting pet-owners, manufacturers, clinics and veterinarians, according to one embodiment.

FIG. 2 shows exploded view 200 of a wellness program plan computing device with different interfaces included in systems and methods of flexible and customizable wellness program plan for pets through a distribution network connecting pet-owners, manufacturers, clinics and veterinarians, according to one embodiment. There is an interface between the distribution network 260 and computing device with the module to receive individualized pet transaction requests and reports 260. Module 260 passes on processed information to next stage processing 290. The wellness plan can be audited by requesting an audit at module 295. The clinic can customize one or more wellness plans that work for its categories of pets or pet-owners at module 240. In one embodiment, each pet owner can customize his or her own wellness plan. The modules operate with a computing device that may have one or more operating systems including Android, iPhone Operating System (iOS) or Internet of Things (IoT) operating system.

The computing device includes software module 210 that includes a wellness plan parameters, lists a wellness plan products 220 and includes the wellness plan services 230 and associated service providers. The wellness plan configurations may be stored locally at a clinic or in a cloud computing environment or in a split client/server type architecture.

The distribution network 260 API/hooks may be incorporated at a system level on the computing device. In one embodiment, depending on the computing device platform the distribution network overlay hooks are implemented using Java Android Software Development Kit (SDK), Objective C, or C++. In one embodiment, any and all communications are controlled using the distribution network overlay architecture that encompasses the operating system to allow for component based flexibility. In one embodiment, a user can customize the alias to go in and out of the distribution network overlay architecture mode. In one embodiment, the overlay network is based on peer to peer network. In one embodiment, the distribution network using an overlay network using the existing public network.

In one embodiment, the computing device includes applications or services that request and make wellness plans configurations and corresponding transactions. In one embodiment, the wellness plan is marketed across more than one clinics, providing a pet owner to visit more than one clinic under a subscription plan. In one embodiment, the individualized pet reports 250 also tracks improvement in health and greenness of a plan. In one embodiment, a veterinarian may select wellness plans to enroll and provide services for within a clinic. In one embodiment, a veterinarian may do regular billing that is absorbed by the clinic and converted to a subscription plan equivalent for the pet-owner.

In one embodiment, manufacturers or clinics may get reports on anomalous activity including misuse of rebates or stealing on invoices, and/or detecting low inventory. In one embodiment, anomalous activity includes detecting pricing that is out of minimum and maximum range for a given dosage.

Figure 3:
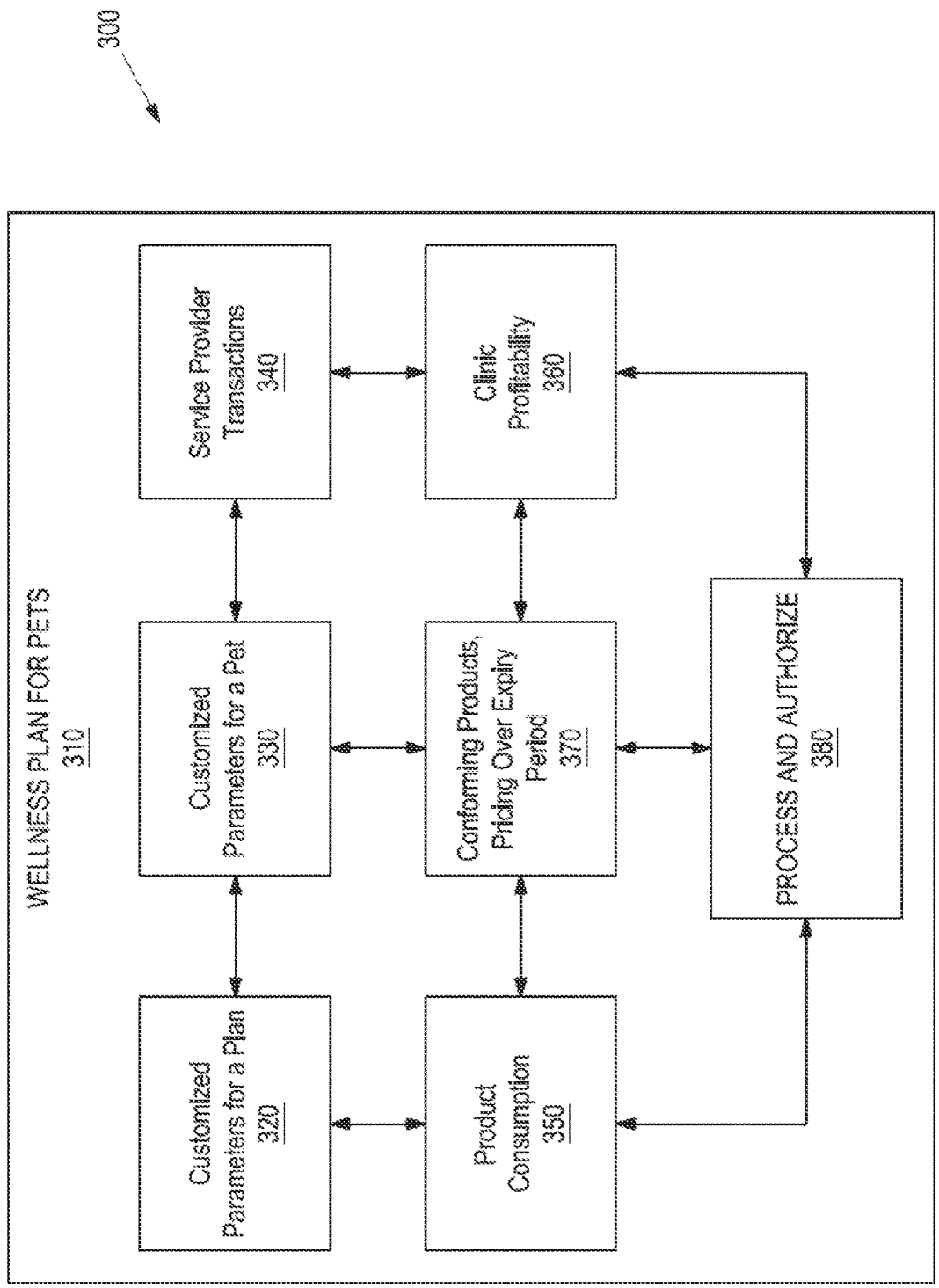
FIG. 3 is an exploded view of different modules included in systems and methods of flexible and customizable wellness program plan for pets through a distribution network connecting pet-owners, manufacturers, clinics and veterinarians, according to one embodiment.

FIG. 3 is an exploded view 300 of different modules included in systems and methods of flexible and customizable wellness program plan for pets through a distribution network connecting pet-owners, manufacturers, clinics and veterinarians, according to one embodiment. FIG. 3 outlines 300 a view of wellness plan implemented as a service in the cloud computing space 310 that includes different modules and functions, according to one embodiment. At 380, the process and authorize module creates, designs and processes different wellness plans that are offered for subscription to different pet-owners. At 350, product consumption is tracked per transaction as approved by the wellness plan. At 320, customized parameters for a plan are decided by a clinic or a pet-owner. At 330, customized parameters for a wellness plan for a pet condition are selected. At 340, service provider transactions are tracked. At 360, clinic profitability is tracked for a given wellness plan. At 370, conforming products, pricing over expiry period and renewal of wellness plans is tracked.

Figure 4:
FIG. 4 is a view of steps of creating a wellness plan, according to one embodiment.

FIG. 4 is a view of steps of creating a wellness plan 400, according to one embodiment. In plan setup, the operator sets the plan start date, the house account, what species (canine, feline, equine, etc.), assigns a pricing schedule, the activation mapping (i.e., what Stock Keeping Unit (SKU) codes will enroll the animal), the plan's cost, and finally the allowed uses for services and products. Some important features to highlight in section 410: Clinic identifier—a unique clinic identifier used with the wellness billing company for reporting and billing status. House Account—A designated account that receives no commission. Needed for tax purposes and in cases where products are dispensed with no doctor involvement. Pricing Schedule—The period where a set of prices and commissions are valid. When a consumer signs up for wellness plans, he is she is technically they are signing up for a set price for 12 months.

Because the pricing was also built off all the current prices for products and services, however, at some point the clinic will take a price increase. Prices changes are not applicable to client already enrolled in plans, but apply only to new enrollments instead. Also, the doctors commission and revenue are based on the pricing of the current plan the patient is in. The WE allows for concurrent pricing schedules to accommodate for people on old plans that have not rolled over and new people coming on to a plan built on increased fees. This also allows commissions to be correctly calculated based on when the original plan was sold. Because clients enroll at different times during the run of a pricing schedule, managing commissions is difficult, and for most clinics impossible to accomplish without dedicated staff and special reports.

Section 420 at the bottom of FIG. 4 includes different options for the Plan and group of plans available in a Plan Group. The bottom section lists different service options or parameters that can be selected.

Figure 5:
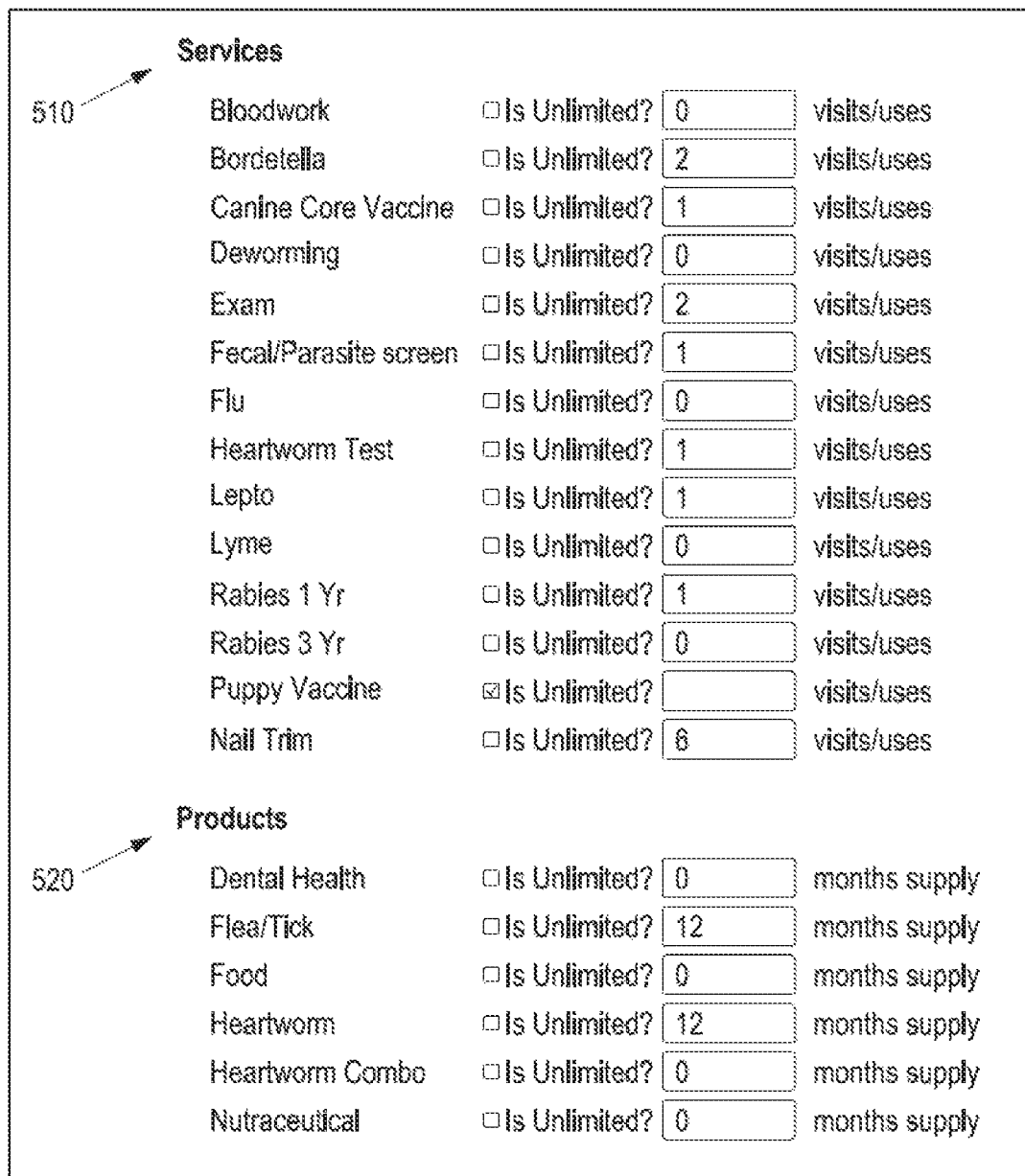
FIG. 5 is a view of enrollment options in a wellness plan, according to one embodiment.

FIG. 5 is a view 500 of enrollment options in a wellness plan, according to one embodiment. The screenshots show different options for services in a plan. In one embodiment, the WE includes Use Counts or Visits—Another complex administrative task comes from tracking multiple clients and what exactly remains in each of their plans, and if they have rolled over or not. At 510, at the top different types of service parameters are included. At 520, closer to the bottom, different products are listed and selected. A person of ordinary skill in the art would understand that the selections and choices given herein are exemplary.

Figure 6:
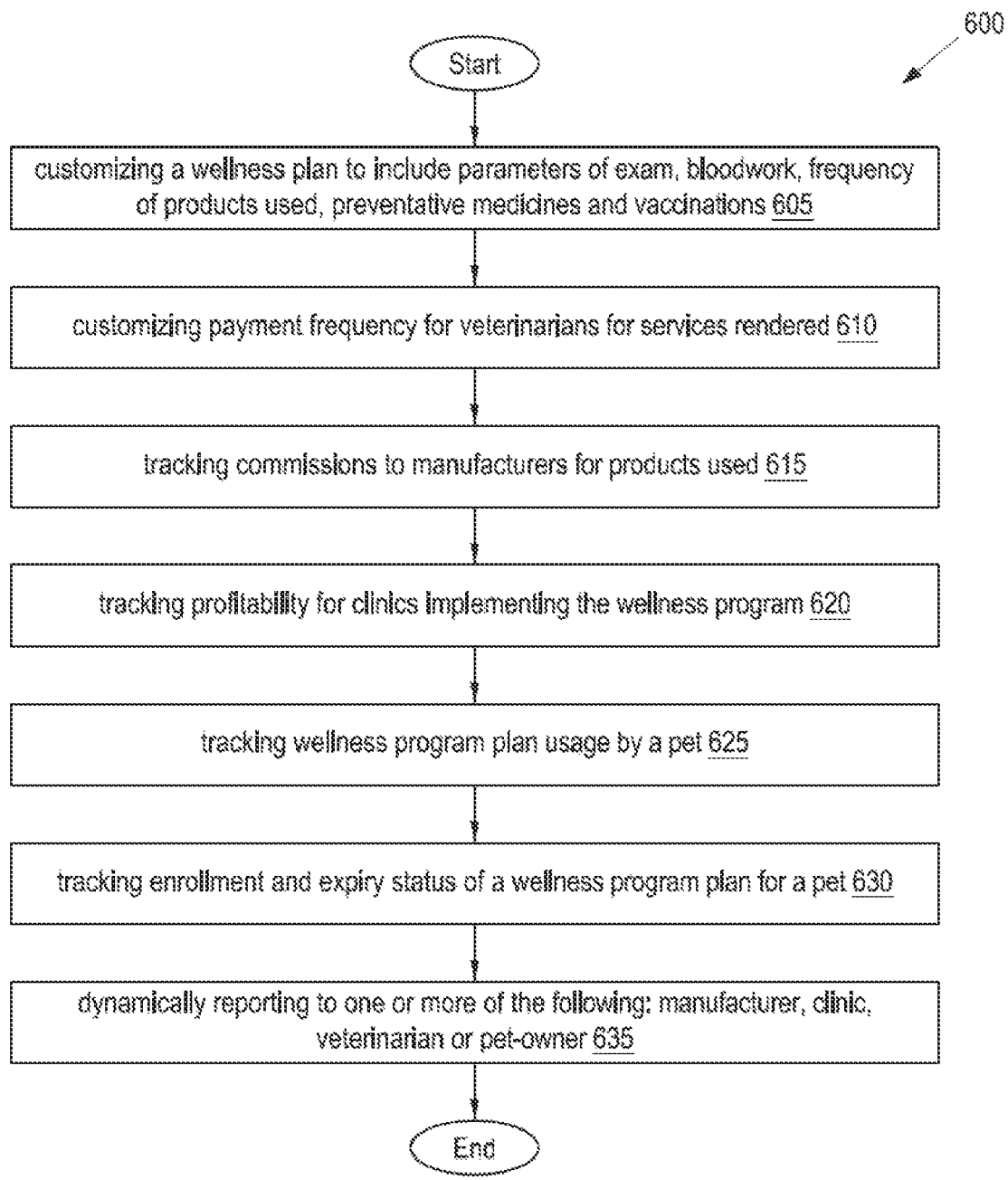
FIG. 6 shows a flowchart illustrating an example of systems and methods of flexible and customizable wellness program plan for pets through a distribution network connecting pet-owners, manufacturers, clinics and veterinarians, according to one embodiment.

FIG. 6 depicts a flowchart 600 illustrating an example of systems and methods of flexible and customizable wellness program plan for pets through a distribution network connecting pet-owners, manufacturers, clinics and veterinarians, according to one embodiment. The flowchart 600 is discussed in conjunction with the environment shown in the diagram 100 in FIG. 1. At block 605, begins with customizing a wellness plan to include parameters of exam, bloodwork, frequency of products used, preventative medicines and vaccinations. At block 610, customizing payment frequency for veterinarians for services rendered. At block 615, tracking commissions to manufacturers for products used. At block 620, tracking profitability for clinics implementing the wellness program. At block 625, tracking wellness program plan usage by a pet. At block 630, tracking enrollment and expiry status of a wellness program plan for a pet. At block 635, dynamically reporting to one or more of the following: manufacturer, clinic, veterinarian or pet-owner. A person of ordinary skill in the art would appreciate that by following the steps outlined above that is inbuilt into the computing device, the distribution network enforces wellness plans creation, design, implementation and transactions that are customized control by the clinic as well as allowing tracking different usage parameters over an extended period of time.

In a broad embodiment, the invention is systems and methods of flexible and customizable wellness program plan for pets allows a clinic with minimal resources and infrastructure to promote and implement flexible and tailored plans that meet the needs of its pet-owners. The system allows implementation of multiple wellness plans at the same time without increasing any administrative burdens of accounting, invoicing or tracking.

Figure 7:
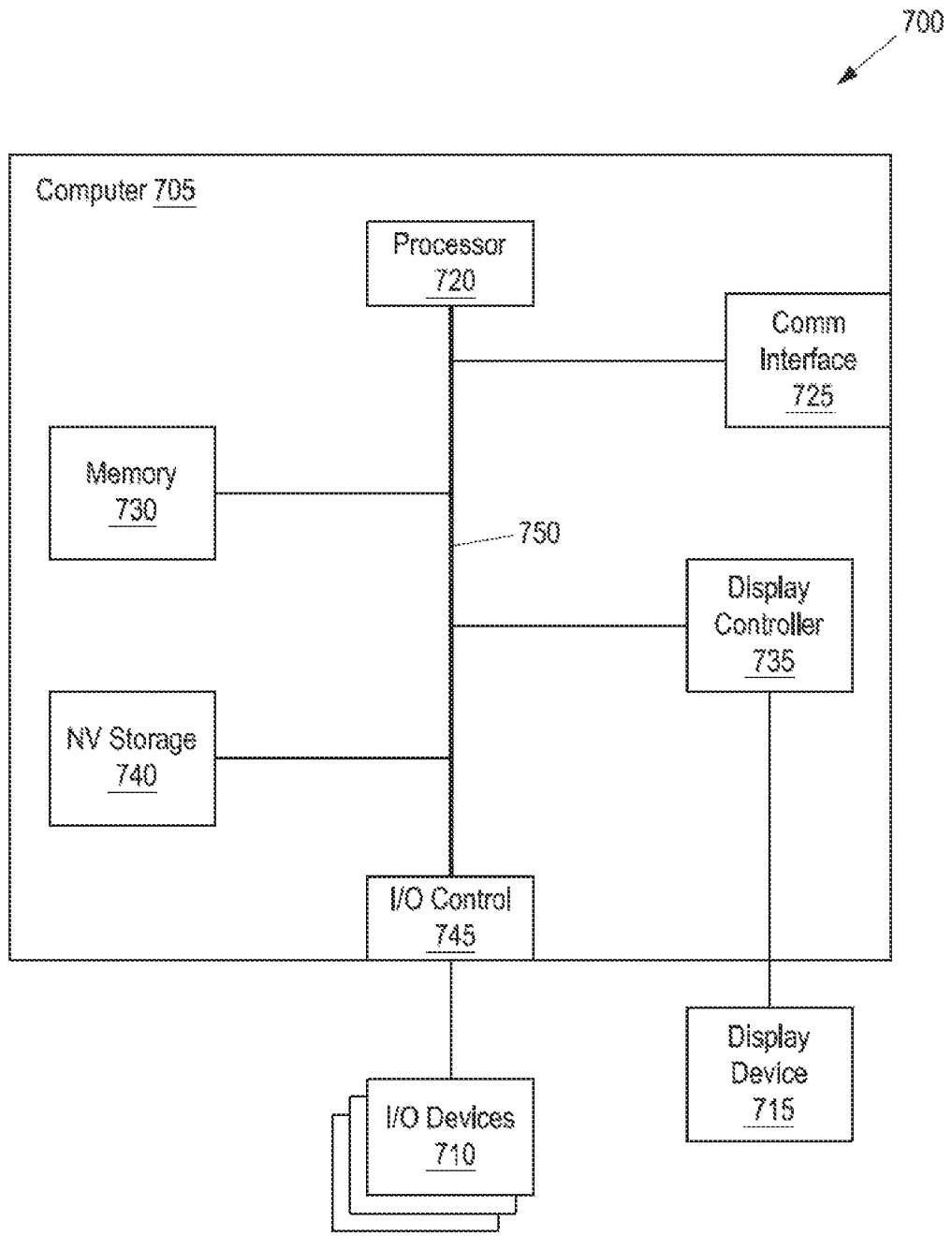
FIG. 7 is a schematic diagram of exemplary computing devices that can be used to implement the methods and systems disclosed herein, according to one embodiment.

FIG. 7 is a schematic diagram of computing device 700 that can be used to implement the methods and systems disclosed herein, according to one or more embodiments. FIG. 7 is a schematic of a computing device 700 that can be used to perform and/or implement any of the embodiments disclosed herein. In one or more embodiments, Internet of Things (IoT) device 110, SDK/API 120, Speak-to-IoT system 130, voice assistants, user end devices with mobile apps 150 or computing devices at service providers 160 of FIG. 1 may be the computing device 700.

The computing device 700 may represent various forms of digital computers, such as laptops, desktops, workstations, personal digital assistants, servers, blade servers, mainframes, and/or other appropriate computers. The computing device 700 may represent various forms of mobile devices, such as smartphones, camera phones, personal digital assistants, cellular telephones, and other similar mobile devices. The components shown here, their connections, couples, and relationships, and their functions, are meant to be exemplary only, and are not meant to limit the embodiments described and/or claimed.

FIG. 7 shows an example of a computing device 700 on which techniques described here can be implemented. The computing device 700 can be a conventional computer system that can be used as a client computer system, such as a wireless client or a workstation, or a server computer system. The computing device 700 includes a computer 705, I/O devices 710, and a display device 715. The computer 705 includes a processor 720, a communications interface 725, memory 730, display controller 735, non-volatile storage 740, and I/O controller 745. The computer 705 may be coupled to or include the I/O devices 710 and display device 715.

The computer 705 interfaces to external systems through the communications interface 725, which may include a modem or network interface. It will be appreciated that the communications interface 725 can be considered to be part of the computing device 700 or a part of the computer 705. The communications interface 725 can be an analog modem, integrated services for digital networks ("ISDN") modem, cable modem, token ring interface, satellite transmission interface (e.g. "direct personal computer" also known as "direct PC"), or other interfaces for coupling a computer system to other computer systems.

The processor 720 may be, for example, a conventional microprocessor such as an Intel Pentium microprocessor or Motorola power PC microprocessor. The memory 730 is coupled to the processor 720 by a bus 750. The memory 730 can be Dynamic Random Access Memory (DRAM) and can also include Static RAM (SRAM). The bus 750 couples the processor 720 to the memory 730, also to the non-volatile storage 740, to the display controller 735, and to the I/O controller 745.

The I/O devices 710 can include a keyboard, disk drives, printers, a scanner, and other input and output devices, including a mouse or other pointing device. The display controller 735 may control in the conventional manner a display on the display device 715, which can be, for example, a cathode ray tube (CRT) or liquid crystal display (LCD). The display controller 735 and the I/O controller 745 can be implemented with conventional well-known technology.

The non-volatile storage 740 is often a magnetic hard disk, an optical disk, or another form of storage for large amounts of data. Some of this data is often written, by a direct memory access process, into memory 730 during execution of software in the computer 705. One of skill in the art will immediately recognize that the terms "machine-readable medium" or "computer-readable medium" includes any type of storage device that is accessible by the processor 720 and also encompasses a carrier wave that encodes a data signal.

The computing device 700 is one example of many possible computer systems that have different architectures. For example, personal computers based on an Intel microprocessor often have multiple buses, one of which can be an I/O bus for the peripherals and one that directly connects the processor 720 and the memory 730 (often referred to as a memory bus). The buses are connected together through bridge components that perform any necessary translation due to differing bus protocols.

Network computers are another type of computer system that can be used in conjunction with the teachings described here. Network computers do not usually include a hard disk or other mass storage, and the executable programs are loaded from a network connection into the memory 730 for execution by the processor 720. A Web TV system, which is known in the art, is also considered to be a computer system, but it may lack some of the components shown in FIG. 7, such as certain input or output devices. A typical computer system will usually include at least a processor, memory, and a bus coupling the memory to the processor.

Though FIG. 7 shows an example of the computing device 700, it is noted that the term "computer system," as used here, is intended to be construed broadly. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller. An example of a computer system is shown in FIG. 7.

The memory can include, by way of example but not limitation, random access memory (RAM), such as dynamic RAM (DRAM) and static RAM (SRAM). The memory can be local, remote, or distributed. As used here, the term "computer-readable storage medium" is intended to include only physical media, such as memory. As used here, a computer-readable medium is intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

The bus can also couple the processor to the non-volatile storage. The non-volatile storage is often a magnetic floppy or hard disk, a magnetic-optical disk, an optical disk, a read-only memory (ROM), such as a Compact Disc Read Only Memory (CD-ROM), Erasable Programmable Read Only Memory (EPROM), or Electrically Erasable Programmable Read Only Memory (EEPROM), a magnetic or optical card, a solid state disk or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory here. Even when software is moved to the memory for execution, the processor will typically make use of hardware registers to store values associated with the software, and local cache that, ideally, serves to speed up execution. As used here, a software program is assumed to be stored at an applicable known or convenient location (from non-volatile storage to hardware registers) when the software program is referred to as "implemented in a computer-readable storage medium." A processor is considered to be "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus can also couple the processor to the interface. The interface can include one or more input and/or output (I/O) devices. The I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. The interface can include one or more of a modem or network interface. It will be appreciated that a modem or network interface can be considered to be part of the computer system. The interface can include an analog modem, isdn modem, cable modem, token ring interface, satellite transmission interface (e.g. "direct PC"), or other interfaces for coupling a computer system to other computer systems. Interfaces enable computer systems and other devices to be coupled together in a network.

A person of ordinary skill in the art would appreciate that flexible and customizable wellness plan as disclosed herein includes network wide control and flexibility as well as individual level control and flexibility without having direct control of a clinic, a manufacturer, a service provider or a pet owner.

FIG. 8 is an exploded view 800 of creating a wellness plan for a clinic, according to one embodiment. At 810, the different services in the wellness plan are listed. At 820, there are tax-rates that need to be adjusted based on the subscription payment plan and the benefits selected. A Tax Exempt flag is available for those products for which no tax is collected. The products selected in a wellness plan for a clinic are then mapped to uniform master list to manage conformity across different clinics and standardize data sets from different clinics. Such mapping allows for uniform reports from different perspectives, including that of a manufacturer, clinic, veterinarian and/or a pet-owner.

FIG. 9 is an exploded second view of creating a wellness plan for a clinic, according to one embodiment. At 910, the different services in the wellness plan are listed. At 920, there are commission rates that need to be adjusted based on the subscription payment plan and the benefits selected. As discussed earlier, the products and services selected in a wellness plan for a clinic are then mapped to uniform master list to manage conformity across different clinics and standardize data sets from different clinics. Such mapping allows for uniform reports from different perspectives, including that of a manufacturer, clinic, veterinarian and/or a pet-owner.

Figure 10:
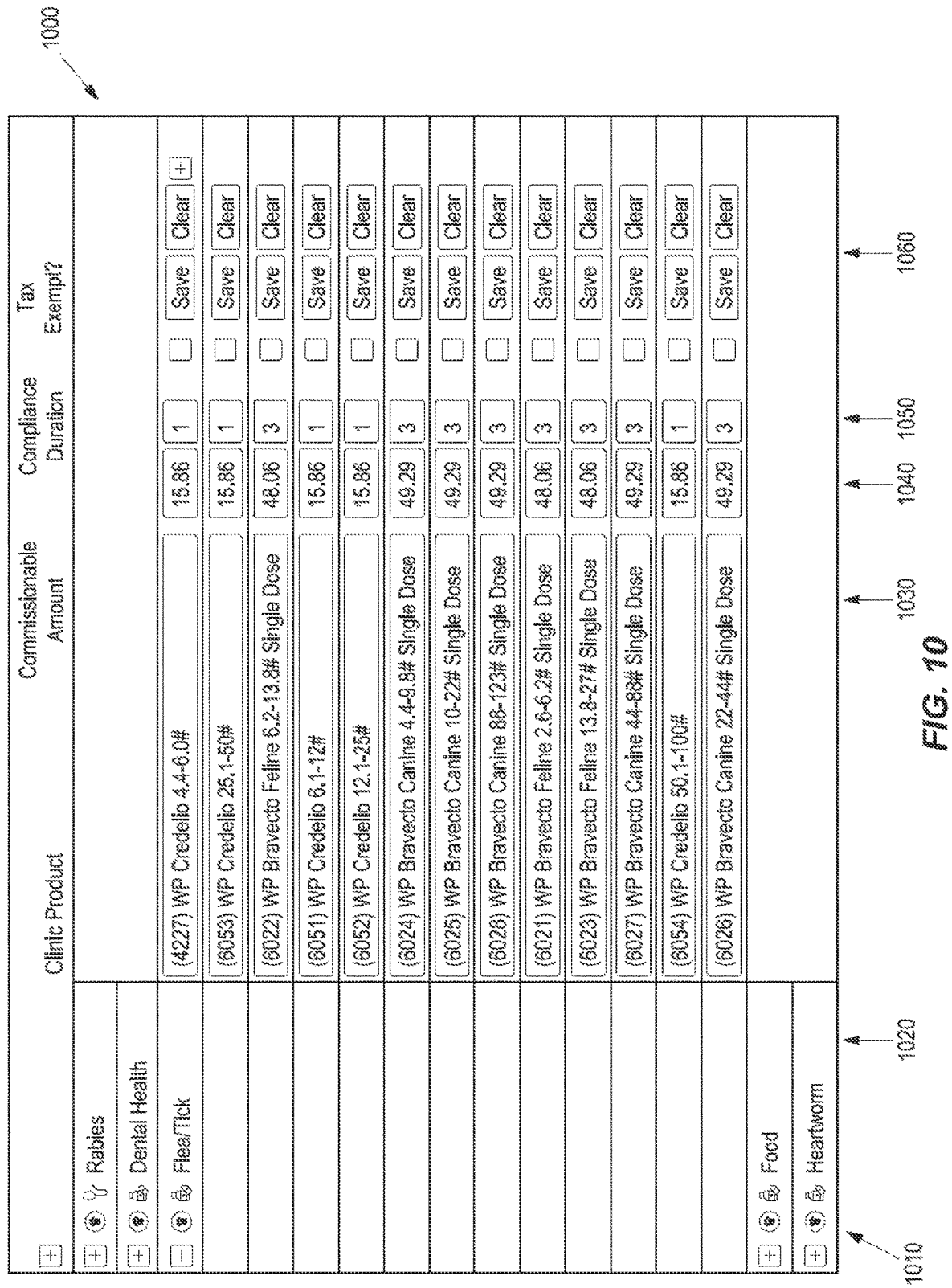
FIG. 10 is an exploded third view of creating a wellness plan for a clinic, according to one embodiment.

FIG. 10 is an exploded third view 1000 of creating a wellness plan for a clinic, according to one embodiment. The view gives examples of products selected in a wellness plan. Products have a compliance duration; i.e., how long they are effective on the animal once applied, such a flea/tick medication (whose compliance varies anywhere between 30 days and 8 months). The WE uses the compliance duration determine when the client is due for more product. For example, in the case of Bravecto listed below, it has a compliance duration of three months. So, on an invoice where the quantity of Bravecto is listed as one, the WE recognizes that the coverage lasts for three months from the date of the invoice. If a pet-owner wants to get another dose within that time frame, the system flags that as an anomaly. Commission rates can be assigned for each of the products and services that have been mapped.

At 1010, there is a category for the wellness plan. Opening up the plus sign shows options available under that category. At 1020 are the categories from the wellness plan. Examples shown are dental health, flea/tick, food, heartworm etc. At 1030, are the products available under that category as benefits of the wellness plan. 1040 shows the commission rate. At 1050 shows the use count or compliance duration. 1060 shows different flags including whether a transaction is tax-exempt etc.

Figure 11:
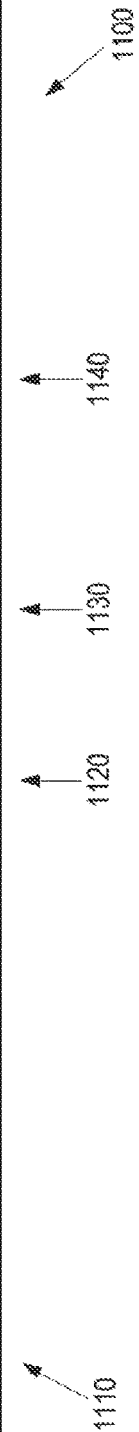
FIG. 11 is an exploded view of setting up service providers for a wellness plan for a clinic, according to one embodiment.

FIG. 11 is an exploded view 1100 of setting up service providers for a wellness plan for a clinic, according to one embodiment. Example of commissions for different service providers are are shown. The WE can keep up with separate rates for products and services when necessary, and across price schedules. This ensures commissions from clients enrolled in plans with different prices schedules are seamlessly calculated.

At 1110 the name of the service provider is given. At 1120 the product commission is given that goes to the manufacturer. At 1130, the services commission is given that goes to the service provider. 1140 gives fields to track the employee or contractor with different flags and edit buttons.

FIG. 12 is an exploded view 1200 of a service provider handling users and related transactions, according to one embodiment. The screenshot shows wellness audit. The audit screen is where the clinic is presented with previous wellness transactions that have been invoiced for wellness patients. These transactions are then grouped by Doctor for the clinic to go verify and sign off on.

In this example, one can see the client, patient and invoice number so that the clinic has enough information to locate the invoice in question on its practice management software. Also available are the date of the invoice, the product or service, how many were used/dispensed, the commission generated and the date of processing. The clinic user can hover over and see the math behind the commission calculation for a more detailed validation.

At 1210, information regarding the pet-owner is given with invoice number and date. At 1220, the product information with dosage is included. At 1230 the quantity used as well as any tracking with use count for the plan is shown. At 1240 the price and invoice processing date is tracked.

The audit screen is where the clinic is presented with previous wellness transactions that have been invoiced for wellness patients. These transactions are then grouped by Doctor for the clinic to go verify and sign off on. In this example, one can see the client, patient and invoice number so that the clinic has a enough information to locate the invoice in question on its practice management software. Also available are the date of the invoice, the product or service, how many were used/dispensed, the commission generated and the date of processing. The clinic user can hover over at 1250 and see the math behind the commission calculation for a more detailed validation.

FIG. 13 is a second exploded view of a service provider 1300 handling users and related transactions, according to one embodiment. This is another example of that shown in FIG. 12. In this screen, there are examples of the adjustments and corrections as well as the sign off section at the bottom. The sign-off feature provides the clinic with a stopping point where its staff can review the activities and commissions of its service providers (such as doctors). The audit screen displayed herein presents a window into the activities of the providers that is invaluable for the early detection of any discrepancies, and before commissions are handed out.

For example, mistakes in mapping can be identified before commissions are reported, and wellness revenue mistakenly reported on a doctor can be corrected and moved without the need to reinvoice. This process would not be possible in a traditional system without multiple manual corrections. Finally, the audit provides a quick and concise way to report commissions on zero-dollar invoice items without manual calculation. This is extremely valuable since zero-dollar items make up almost the totality of line items (and thus calculations) on invoices for clients enrolled in plans.

Figure 14:
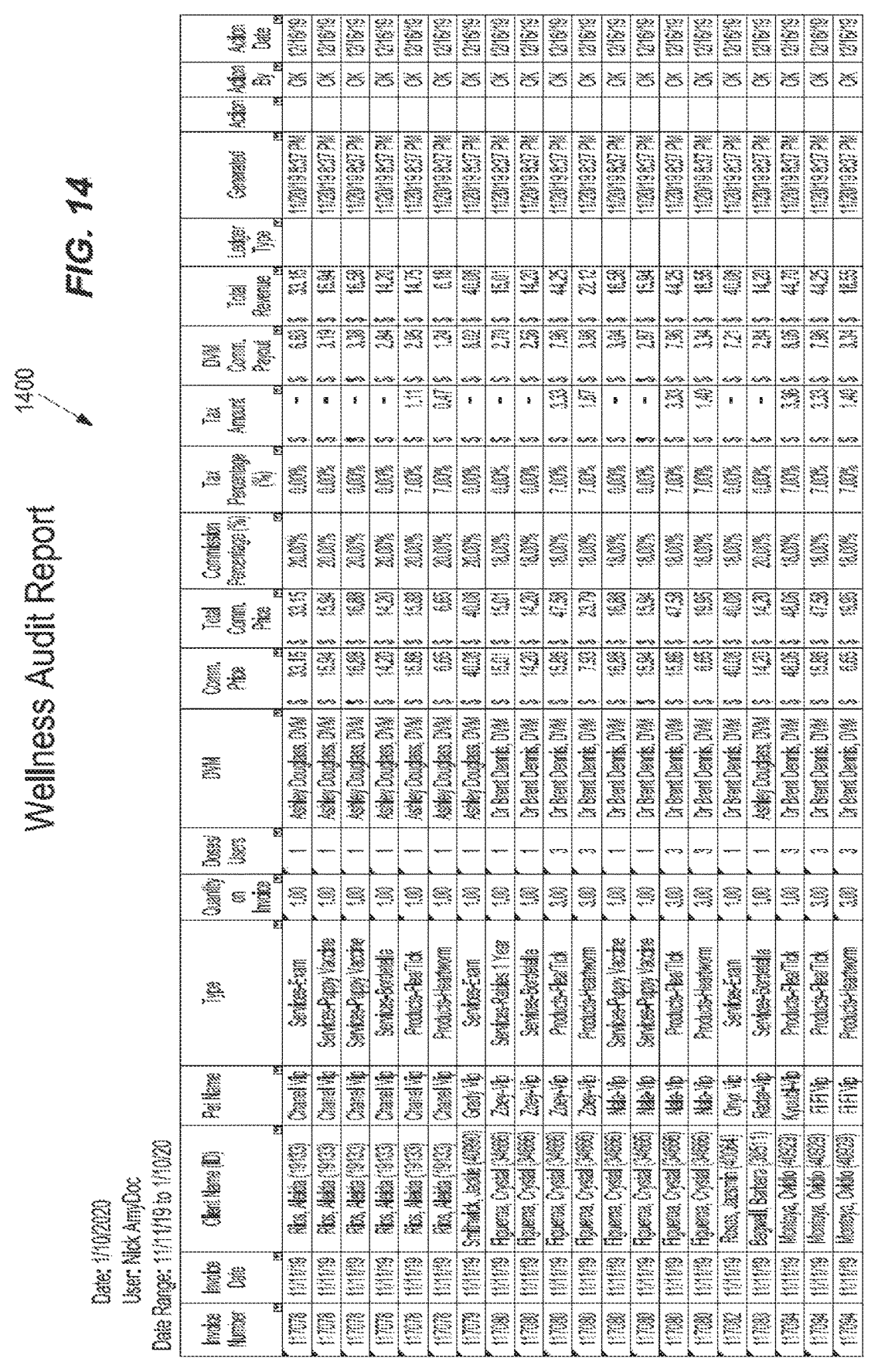
Figure 14:
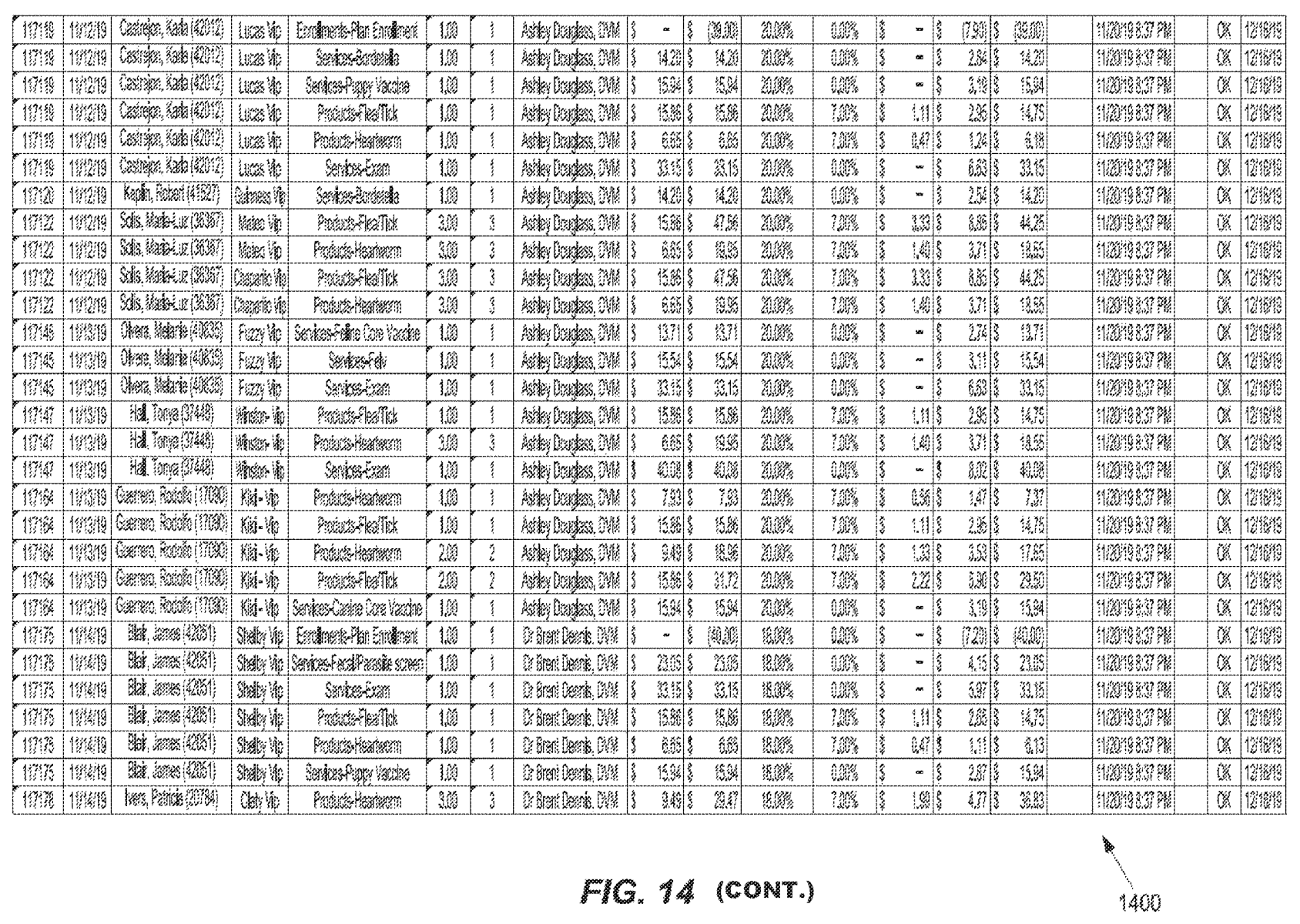

FIG. 14 is an exploded view of wellness plan accounting 1400, according to one embodiment. The screenshot lists the submitted items from the audit page. They form a fully reconcilable report that is prefiltered and shows all pertinent information about the wellness transactions. The granularity and ease of use are another feature of the WE that sets it apart from traditional tracking methods.

FIG. 15 is an exploded view 1500 of tracking from a user's perspective, according to one embodiment. The screenshot shows the plan usage tracking aspect that provide a view into the current plan usage for the patient. This is designed to be viewed by a receptionist or tech as clients come in for service. The screenshot shows that there is a search field 1510 that will work with client or patient name, a list of clients and plan status.

FIG. 16 is a second exploded view 1600 of tracking from a user's perspective, according to one embodiment. This expanded view provides immediately a complete picture of what the client is still eligible for on their plan. To assemble this information without WE, the clinic would need an error-prone paper process together with a time-consuming lookup in the practice management system of multiple invoices over multiple months. This view with the uses remaining and next dispense date also protects the clinic from over proscribing or delivering services which are not included in the plan.

FIG. 17 is a third exploded view 1700 of tracking from a user's perspective, according to one embodiment. Another aspect of WE is the management of plans that have been cancelled so that further service under that plan is denied. The screenshot shows that the cancelled plans are also tracked easily. When compared to the traditional methods listed above, the WE allows accuracy, efficiency, and speed not otherwise available to a clinic.

While the examples herein are shown for distribution network of products and services for pets that sold at different veterinary clinics using different veterinarians or service providers and sourced from different manufacturers, a person of ordinary skill in the art would understand that the disclosure can be applied to different types of distribution networks of products. For example, this could apply equally to a distribution network for contact lens and ophthalmologists, salons with beauty parlor products, fitness/gyms with instructors, or dentist with cosmetic teeth whitening products.

Several components described here, including clients, servers, and engines, can be compatible with or implemented using a cloud-based computing system. As used here, an overlay network including, for example, a peer to peer network, is a system that provides computing resources, software, and/or information to client systems by maintaining de-centralized services and resources that the client systems can access over a communications interface, such as a network. A person of ordinary skill in the art would understand that different modules or components described herein could be implemented using a cloud-based computing system. Such systems can involve a subscription for services or use a utility pricing model. Users can access the protocols of the distribution network through a web browser or other container application located on their client system.

The invention disclosure describes techniques that those of skill in the art can implement in numerous ways. For instance, those of skill in the art can implement the techniques described here using a process, an apparatus, a system, a composition of matter, a computer program product embodied on a computer-readable storage medium, and/or a processor, such as a processor configured to execute instructions stored on and/or provided by a memory coupled to the processor. Unless stated otherwise, a component such as a processor or a memory described as being configured to perform a task may be implemented as a general component that is configured to perform the task at a given time or a specific component that is manufactured to perform the task. As used here, the term 'processor' refers to one or more devices, circuits, and/or processing cores configured to process data, such as computer program instructions.

A detailed description of one or more implementations of the invention is provided here along with accompanying figures that illustrate the principles of the invention. The invention is described in connection with such implementations, but the invention is not limited to any implementation. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Techniques described here relate to apparatus for performing the operations. The apparatus can be specially constructed for the required purposes, or it can comprise a general-purpose computer selectively activated or reconfigured by a computer program stored in the computer. Such a computer program may be stored in a computer-readable storage medium, such as, but is not limited to, read-only memories (ROMs), random access memories (RAMS), EPROMs, EEPROMs, magnetic or optical cards, any type of disk including floppy disks, optical disks, CD-ROMs, and magnetic-optical disks, or any type of media suitable for storing electronic instructions, and each coupled to a computer system bus. Although the foregoing implementations have been described in some detail for purposes of clarity of understanding, implementations are not necessarily limited to the details provided.

A number of embodiments have been described. Nevertheless, it will be understood that various modifications may be made without departing from the spirit and scope of the claimed invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It may be appreciated that the various systems, methods, and apparatus disclosed herein may be embodied in a machine-readable medium and/or a machine accessible medium compatible with a data processing system (e.g., a computer system), and/or may be performed in any order. The structures and modules in the figures may be shown as distinct and communicating with only a few specific structures and not others. The structures may be merged with each other, may perform overlapping functions, and may communicate with other structures not shown to be connected in the figures.

The above-described functions and components may be comprised of instructions that are stored on a storage medium such as a computer readable medium. The instructions may be retrieved and executed by a processor. Some examples of instructions are software, program code, and firmware. Some examples of storage medium are memory devices, tapes, disks, integrated circuits, and servers. The instructions are operational when executed by the processor to direct the processor to operate in accord with some embodiments. Those skilled in the art are familiar with instructions, processor(s), and storage medium.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention. A detailed description of one or more implementations of the invention is provided here along with accompanying figures that illustrate the principles of the invention. The invention is described in connection with such implementations, but the invention is not limited to any implementation. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The structures and modules in the figures may be shown as distinct and communicating with only a few specific structures and not others. The structures may be merged with each other, may perform overlapping functions, and may communicate with other structures not shown to be connected in the figures.

The invention claimed is:

1. A non-transient computer-readable media containing a plurality of machine-readable instructions, that when executed result in a method of managing a health wellness program plan for pets through a distribution network connecting pet-owners, manufacturers, clinics and veterinarians, comprising the steps of:
   customizing a wellness plan to include one or more of following parameters: frequency of services including exams or bloodwork, frequency of products used including vaccinations or preventatives and frequency of payments;
   customizing payment frequency for veterinarians for services rendered;
   tracking commissions to manufacturers for products used;

tracking profitability for clinics implementing wellness program;
tracking wellness program plan usage by a pet;
tracking enrollment and expiry status of a wellness program plan for a pet; and
dynamically reporting to one or more of the following: manufacturer, clinic, veterinarian or pet-owner.

2. The non-transient computer-readable media containing a plurality of machine-readable instructions of claim 1, further comprising receiving input from a clinic to create wellness program plan.

3. The non-transient computer-readable media containing a plurality of machine-readable instructions of claim 1, further comprising: providing pricing based on wellness program plan enrollment status for a period of time.

4. The non-transient computer-readable media containing a plurality of machine-readable instructions of claim 1, further comprising: customizing tax rate based on clinic location.

5. The non-transient computer-readable media containing a plurality of machine-readable instructions of claim 1, wherein the reporting includes audit reports.

6. The non-transient computer-readable media containing a plurality of machine-readable instructions of claim 1, wherein the reporting includes an inventory report for a clinic based on products used in wellness program plan.

7. The non-transient computer-readable media containing a plurality of machine-readable instructions of claim 1, wherein reporting includes reporting of services provided for the wellness program plan by a veterinarian at a clinic.

8. The non-transient computer-readable media containing a plurality of machine-readable instructions of claim 1, further comprising:
allowing adjustments and corrections through a verified sign-off process.

9. The non-transient computer-readable media containing a plurality of machine-readable instructions of claim 1, further comprising:
allowing corrections without requiring re-entry of invoices.

10. The non-transient computer-readable media containing a plurality of machine-readable instructions of claim 1, further comprising:
providing reminders to pet-owners on upcoming service or product usage.

11. A system for managing a customizable wellness program plan for pets through a distribution network connecting pet-owners, manufacturers, clinics and veterinarians, comprising:

a computing device configured to:
customize a wellness plan to include one or more of following parameters:
frequency of services including exams or bloodwork, frequency of products used including vaccinations or preventatives and frequency of payments;
customize payment frequency for veterinarians for services rendered;
track commissions to manufacturers for products used;
track profitability for clinics implementing wellness program;
track wellness program plan usage by a pet;
track enrollment and expiry status of a wellness program plan for a pet; and
dynamically report to one or more of the following: manufacturer, clinic, veterinarian or pet-owner;
a user interface in electronic communication with the computing device for inputting information concerning a pet into the computing device.

12. The system of claim 11, wherein the computing device is configured to receive input from a clinic to create a wellness program plan.

13. The system of claim 11, wherein the computing device is configured to provide pricing based on wellness program plan enrollment status for a period of time.

14. The system of claim 11, the computing device configured to: customize tax rate based on clinic location.

15. The system of claim 11, wherein the report includes audit reports.

16. The system of claim 11, wherein the report includes an inventory report for a clinic based on products used in wellness program plan.

17. The system of claim 11, wherein the report includes report of services provided for the wellness program plan by a veterinarian at a clinic.

18. The system of claim 11, wherein the computing device configured to:
allow adjustments and corrections through a verified sign-off process.

19. The system of claim 11, wherein the computing device configured to:
allow corrections without requiring re-entry of invoices.

20. The system of claim 11, wherein the computing device configured to:
provide reminders to pet-owners on upcoming service or product usage.

* * * * *